United States Patent
Li et al.

(10) Patent No.: US 11,050,319 B2
(45) Date of Patent: *Jun. 29, 2021

(54) ESP MOTOR WITH STATOR CORE SECTIONS SEALED TO FORM A STATOR CHAMBER

(71) Applicant: Baker Hughes, LLC, Houston, TX (US)

(72) Inventors: Yong Li, Owasso, OK (US); John M. Knapp, Claremore, OK (US); Jackson Reynolds, Claremore, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,469

(22) Filed: Dec. 13, 2019

(65) Prior Publication Data

US 2020/0119612 A1 Apr. 16, 2020

Related U.S. Application Data

(63) Continuation of application No. 15/443,722, filed on Feb. 27, 2017, now Pat. No. 10,541,582.

(Continued)

(51) Int. Cl.
*H02K 5/132* (2006.01)
*H02K 5/128* (2006.01)

(Continued)

(52) U.S. Cl.
CPC ........... *H02K 5/132* (2013.01); *E21B 43/128* (2013.01); *F04B 17/03* (2013.01); *F04B 47/02* (2013.01);

(Continued)

(58) Field of Classification Search
CPC .......... H02K 5/132; H02K 5/136; H02K 5/10; H02K 5/12; H02K 5/124; H02K 5/1285;

(Continued)

(56) References Cited

U.S. PATENT DOCUMENTS 1,960,484 A * 5/1934 Ekstromer ............. H02K 5/132
310/112
2,055,481 A * 9/1936 Coberly ................. H02K 5/132
310/112

(Continued)

*Primary Examiner* — Maged M Almawri
(74) *Attorney, Agent, or Firm* — Sprinkle IP Law Group

(57) ABSTRACT

Systems and methods for electric motor, where the stator core has one or more stator core sections, each of which is a single-piece unit formed of soft magnetic composite (SMC) material, and where the stator core sections are positioned end-to-end with seals at each end to form a plurality of stator slots, where each of the stator slots extends through each of the stator core sections and is in fluid communication with the others to form a sealed stator chamber. The sealed stator chamber may have an expansion chamber to allow expansion and contraction of dielectric fluid in the stator chamber while maintaining separation of the dielectric oil from lubricating oil which is within the motor but external to the stator chamber. The sealed stator chamber can prevent well fluids that leak into the motor from reaching the stator windings and degrading their insulation.

11 Claims, 5 Drawing Sheets

Related U.S. Application Data

(60) Provisional application No. 62/305,447, filed on Mar. 8, 2016.

(51) Int. Cl.

| | | |
|---|---|---|
| *H02K 9/197* | (2006.01) | |
| *F04B 47/06* | (2006.01) | |
| *E21B 43/12* | (2006.01) | |
| *H02K 7/14* | (2006.01) | |
| *H02K 11/30* | (2016.01) | |
| *F04B 17/03* | (2006.01) | |
| *F04B 47/02* | (2006.01) | |
| *H02K 5/10* | (2006.01) | |
| *H02K 5/124* | (2006.01) | |
| *H02K 5/22* | (2006.01) | |
| *H02K 17/02* | (2006.01) | |
| *H02K 1/02* | (2006.01) | |

(52) U.S. Cl.
CPC ............... *F04B 47/06* (2013.01); *H02K 5/10* (2013.01); *H02K 5/124* (2013.01); *H02K 5/1285* (2013.01); *H02K 5/225* (2013.01); *H02K 7/14* (2013.01); *H02K 9/197* (2013.01); *H02K 11/30* (2016.01); *H02K 17/02* (2013.01); *H02K 1/02* (2013.01); *H02K 2201/15* (2013.01); *H02K 2213/09* (2013.01)

(58) Field of Classification Search
CPC ........ H02K 5/225; H02K 11/30; H02K 17/02; H02K 1/148; H02K 1/14; F04B 17/03; F04B 47/02
USPC ............................ 310/112, 87, 88, 91, 90, 89
See application file for complete search history.

(56) References Cited

U.S. PATENT DOCUMENTS

| | | | | |
|---|---|---|---|---|
| 2,251,816 A * | 8/1941 | Arutunoff | .............. | H02K 5/132 310/87 |
| 4,329,122 A * | 5/1982 | Owada | .................... | F04D 13/10 310/112 |
| 4,558,247 A * | 12/1985 | Yamamoto | ........... | H02K 5/1285 310/87 |
| 4,562,385 A * | 12/1985 | Rabson | .................. | H02K 41/02 310/14 |
| 4,638,198 A * | 1/1987 | Cochran | ................ | H02K 5/167 310/157 |
| 4,815,949 A * | 3/1989 | Rabson | ................... | F04B 47/06 310/14 |
| 6,288,470 B1* | 9/2001 | Breit | ........................ | H02K 3/30 310/254.1 |
| 6,688,860 B2* | 2/2004 | Du | ........................ | E21B 43/128 310/87 |
| 6,794,788 B1* | 9/2004 | Smith | .................... | H02K 5/132 310/254.1 |
| 8,616,863 B2* | 12/2013 | Forsberg | .................. | F04D 1/06 417/423.13 |
| 8,905,727 B2* | 12/2014 | Frey | ........................ | F04B 47/06 417/414 |
| 9,509,190 B2* | 11/2016 | Hallundbæk | ........ | H02K 5/1732 |
| 9,627,945 B2* | 4/2017 | Biggs | ..................... | H02K 11/40 |
| 2004/0136849 A1* | 7/2004 | Du | ........................ | F04D 15/0077 417/423.11 |
| 2005/0167096 A1* | 8/2005 | Du | ........................ | E21B 43/128 166/105 |
| 2006/0037743 A1* | 2/2006 | Head | ..................... | H02K 5/1285 166/66.4 |
| 2007/0273225 A1* | 11/2007 | Head | ........................ | H02K 3/30 310/87 |
| 2010/0172773 A1* | 7/2010 | Watson | .................... | F04B 47/04 417/410.1 |
| 2012/0063934 A1* | 3/2012 | Rumbaugh | .............. | H02K 3/34 417/410.1 |
| 2013/0272898 A1* | 10/2013 | Toh | ........................ | F04D 13/10 417/44.1 |
| 2014/0265673 A1* | 9/2014 | Kreidler | ................. | H02K 3/522 310/71 |
| 2014/0312716 A1* | 10/2014 | Hunter | .................. | H02K 41/031 310/12.18 |
| 2016/0072359 A1* | 3/2016 | Kreidler | .................... | H02K 5/18 310/68 D |
| 2016/0285339 A1* | 9/2016 | Smith | ..................... | H02K 11/30 |
| 2017/0306733 A1* | 10/2017 | Reeves | ................... | F04D 13/10 |
| 2018/0026500 A1* | 1/2018 | Woolmer | ................. | H02K 1/146 310/43 |
| 2018/0216448 A1* | 8/2018 | Bittencourt | ............ | H02K 5/225 |

* cited by examiner

ESP MOTOR WITH STATOR CORE SECTIONS SEALED TO FORM A STATOR CHAMBER

CROSS-REFERENCE TO RELATED APPLICATIONS

This application is a continuation of and claims a benefit of priority under 35 U.S.C. 120 from U.S. patent application Ser. No. 15/443,722 filed Feb. 27, 2017, which claims the benefit of priority under 35 U.S.C. 119 from U.S. Provisional Patent Application 62/305,447, filed Mar. 8, 2016, by Yong Li, et al., which are hereby fully incorporated herein by reference for all purposes.

BACKGROUND

Field of the Invention

The invention relates generally to electric motors, and more particularly to systems and methods for reducing or preventing degradation of electrical insulation that separates the windings of a motor for use in such applications as submersible electric pump (ESP) systems by providing a hermetic seal that prevents the ingress of wellbore fluids into the motor's stator chamber where they can reach the windings.

Related Art

Artificial lift systems such as ESPs are commonly used in the production of oil from wells when the pressure in a producing geological formation is not sufficient to force the oil out of the formation and to the surface of the well. The ESP is positioned in the well, at or near the producing formation, and is operated to pump the oil out of the well.

The ESP includes a pump and an electric motor. The motor is typically coupled to an electric drive system positioned at the surface of the well. The drive provides power to the motor to run the motor. The motor in turn drives the pump, which lifts the oil out of the well. The motor may have a rotary design in which a rotor rotates within a stator, or it may have a linear design in which a mover moves in a reciprocating motion within the stator. The present disclosure will focus on rotary designs, but may be applicable to linear designs as well.

The ESP motor uses windings or coils of electrical wire in a stator to generate rotating magnetic fields. These rotating magnetic fields interact with the magnetic fields of the rotor, causing it to move within the motor. The magnetic fields of the rotor may be produced by permanent magnets in the rotor (in a permanent magnet motor), or they may be produced by electrical currents that are induced in the rotor by rotor slip with respect to the magnetic fields of the stator (in an induction motor).

The windings in the stator normally have a layer of electrical insulation that electrically isolates the windings' conductors. If wellbore fluids leak into the motor and come into contact with the electrical insulation, they can cause or accelerate degradation of the insulation. Even if the well fluid does not get into the motor, the winding can also be adversely affected by the self-contained moisture in the motor oil. In some cases, dielectric oil which is in the motor may contain additives for lubrication purpose, such as esters that can react with moisture or water in the motor oil at elevated temperatures to produce alcohols and acids. These may further accelerate degradation of the electrical insulation. Eventually, degradation of the windings' electrical insulation may be substantial enough to result in short circuits between turns of the windings, between different phases (i.e., between separate windings that are energized by different phases of the input power), and even between one of the phases and ground, any of which may reduce the efficiency of the motor or cause it to fail.

SUMMARY OF THE INVENTION

This disclosure is directed to systems and methods for reducing or preventing degradation of electrical insulation in an electric motor such as may be used in an ESP system, where the motor is sealed to prevent wellbore fluids from reaching the winding insulation system of the motor. In one embodiment, a stator core is formed by one or more elongated stator core sections made of Soft Magnetic Composite (SMC) material, rather than a stack of thin laminations, as in a conventionally constructed stator. Seals are provided between stator sections and at the ends of the stator core so that wellbore fluids are prevented from entering the stator chamber and are thereby prevented from coming into contact with the insulated wires of the stator windings. An expansion mechanism such as a bellows is provided to allow dielectric oil within the stator to expand or contract without damaging the seals as the motor experiences changes in temperature.

One embodiment comprises an apparatus which has a stator core that includes one or more stator core sections. Each of the stator core sections is a single-piece unit that is formed of a SMC material. The stator core sections are positioned end-to-end, and seals are positioned between the stator core sections so that a set of sealed stator slots extend through the stator core sections (with each stator slot extending through each stator core section). A sealed stator chamber that includes the stator slots is formed, where fluids external to the stator chamber are prevented from entering the stator chamber. The sealed stator chamber thereby prevents well fluids that leak into the motor from coming into contact with the stator windings in the stator chamber, and thereby prevents the well fluids from degrading the insulation of the windings.

The stator may be used in an electric motor, such as a downhole motor that is coupled to a pump in an ESP system. An electric drive may be coupled to the motor to drive the motor, which in turn drives the pump. The motor includes a rotor which is installed within a bore of the stator. The rotor and stator are installed in an enclosed motor housing, forming a rotor chamber that is separate from the stator chamber. The rotor chamber is filled with motor oil that lubricates the rotor, while the stator chamber is filled with a dielectric oil that insulates the stator windings. Because the stator chamber is sealed, the two different types of oil remain separated, and any well fluids that leak into the motor are contained in the motor oil in the rotor chamber. The stator chamber may include an expansion chamber that uses a bellows and/or other movable components to allow the dielectric oil to expand and contract with changes in temperature. In one embodiment, the expansion chamber expands into the rotor chamber so that increases in the volume of the stator chamber (including the expansion chamber) reduce the volume of the rotor chamber within the motor housing. A separate expansion chamber which is external to the motor housing (typically within a seal section of the ESP system) accommodates changes in the volume of the rotor chamber.

An alternative embodiment comprises a method for reducing degradation of the electrical insulation of the windings of a motor that may be used in such applications as ESP systems. In one embodiment, a set of stator core sections are provided, where each stator core section is a single-piece unit formed of SMC material. The stator core sections are positioned end-to-end, with seals between them. The stator core sections thereby form a stator core having stator slots that extend through each of the stator core sections. The stator slots are in fluid communication with each other and thereby form a sealed stator chamber, where fluids external to the stator chamber are prevented from entering the stator chamber, and are thereby prevented from contacting the stator windings that are installed within the stator slots. The stator chamber may also contain the end windings, Wye point, lead wires and pothead connection of the motor. An expansion chamber may be included in the stator chamber to allow the volume of the expansion chamber to be variable. The method may include installing a rotor within a bore of the stator and installing the rotor and stator in an enclosed motor housing to form a motor. The stator chamber may be filled with a first, dielectric oil, and filling a rotor chamber (which is interior to the motor housing but is separate and sealed from the stator chamber) with a second, lubricating oil.

Various other alternative embodiments are also possible.

BRIEF DESCRIPTION OF THE DRAWINGS

Other objects and advantages of the invention may become apparent upon reading the following detailed description and upon reference to the accompanying drawings.

Figure 1:
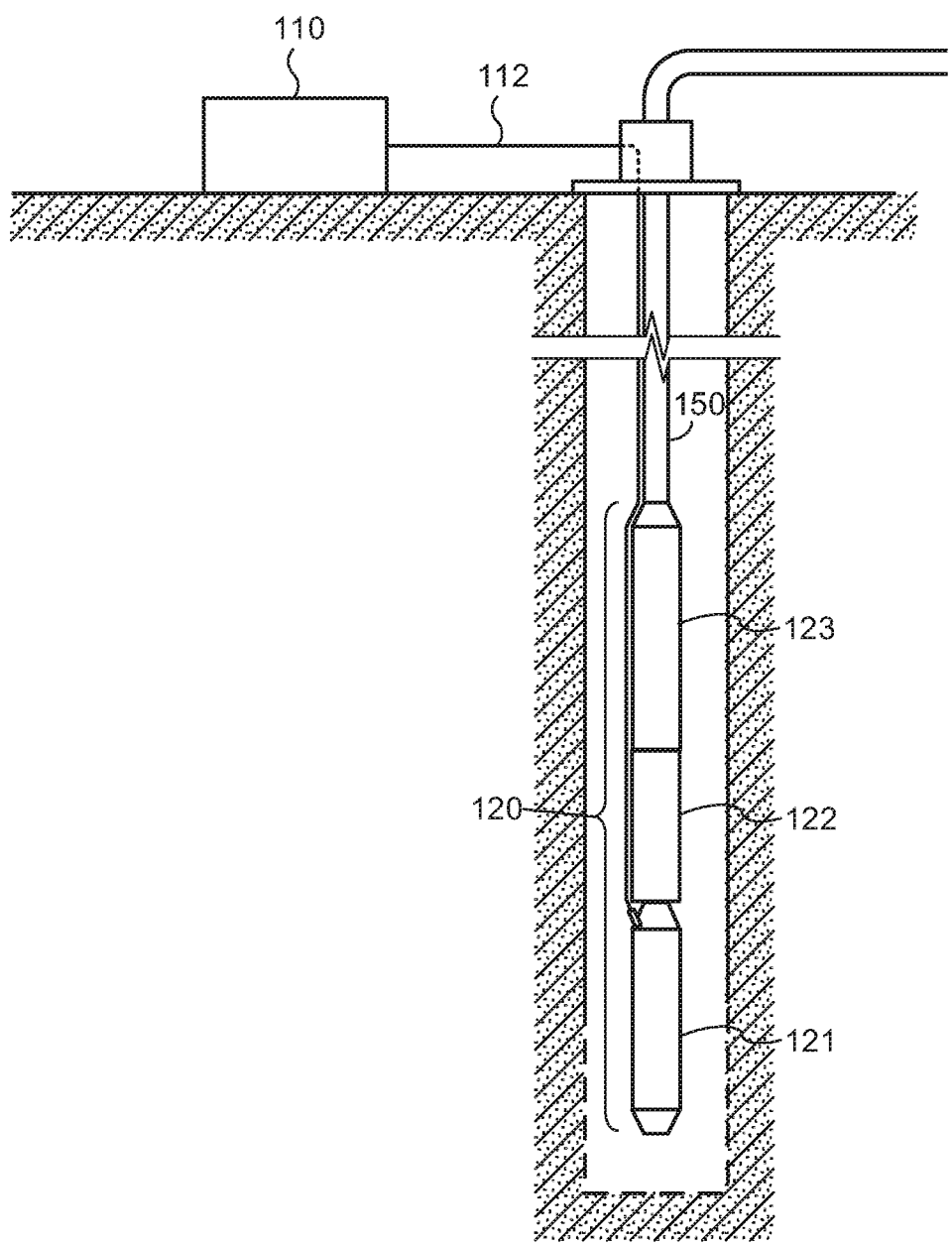
FIG. 1 is a diagram illustrating an exemplary ESP system in which one embodiment of the present invention may be implemented.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for reducing or preventing degradation of electrical insulation in an electric motor (e.g., for use in an ESP system), where a stator core is formed by elongated stator core sections having seals at each end to prevent wellbore fluids from entering the interior of the stator core and coming into contact with the insulated wires of the stator windings.

An ESP system is commonly positioned deep within a subterranean well. Referring to FIG. 1, a diagram illustrating an exemplary ESP system in which one embodiment of the present invention may be implemented is shown. In this embodiment, the ESP system is installed in a well for the purpose of producing oil or other fluids. An ESP 120 is coupled to the end of tubing string 150, and the ESP and tubing string are lowered into the wellbore to position the ESP in a producing portion of the well (as indicated by the dashed lines at the bottom of the wellbore). Surface equipment that includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

ESP 120 includes a motor section 121, seal section 122, and pump section 123. ESP 120 may include various other components which will not be described in detail here because they are well known in the art and are not important to a discussion of the invention. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112 that extends from drive system 110 to ESP 120.

The environment to which the ESP system is exposed downhole in the well may be very harsh. For instance, the temperature and pressure are typically very high (several hundred degrees F. and several thousand psi), and are subject to fluctuations. Further, the fluids in the well may be corrosive, particles in the wellbore fluids may be abrasive, and even water in the wellbore fluids may be damaging to the ESP. Exposure to this environment can cause the components of an ESP system to degrade and possibly fail.

One problem that may be experienced by ESPs is the leakage of water into the interior of the ESP motor's stator. Even though the housings of ESP motors are normally designed to be sealed against wellbore fluids, the seals may fail after continued use, and well fluids such as water eventually penetrate the housings of most ESP motors. There may be several pathways through which water can penetrate the housing of the motor and reach the stator windings. Exposure of the stator windings to water can degrade the electrical insulation that surrounds the wires which form the windings. Additionally, if the dielectric oil in the motor contains additives such as esters, they may react with the water to form alcohols and acids that further aggravate the degradation of the insulation.

Figure 2:
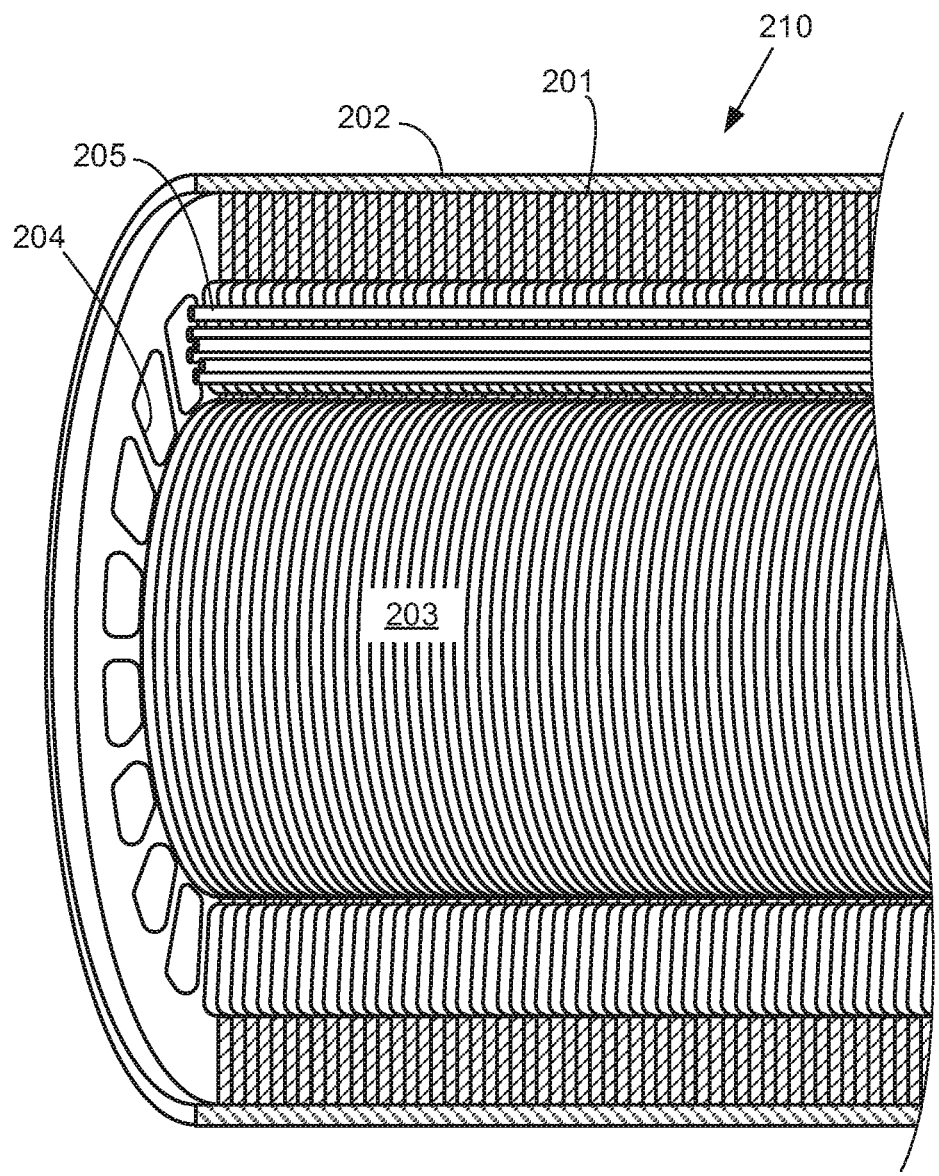
FIG. 2 is a diagram illustrating a cross-sectional view of a conventional laminated-construction stator.

Conventionally, the core of the motor's stator is constructed by stacking a set of thin, annular plates—commonly referred to as "laminations"—and pressing the stacked laminations into a stator housing. This lamination stack structure is shown in FIG. 2, which depicts a cross-section of the stator through its longitudinal axis. It can be seen that the core of the stator 210 is formed by stacking a set of identical laminations (e.g., 201) together. The stacked laminations are pressed into a stator housing 202. The stator core has a central bore 203 within which the rotor is positioned, and a plurality of slots (e.g., 204) that accommodate the windings 205 of the stator.

If the seal section or housing seals fail and wellbore fluids such as water leak into the motor, they may be able to enter the ends of the stator slots. Additionally, although the laminations of the conventional stator core in FIG. 2 are pressed together, they may still allow fluid under high pressure to seep between the laminations and into the stator slots. Once the fluids enter the stator slots in which the windings are positioned, contact between the fluids and the insulation on the windings can degrade the insulation and cause short circuits. If the fluids react chemically with additives in the dielectric oil in the motor, alcohols and acids may be formed, and these may aggravate degradation of the winding insulation.

In order to prevent degradation of the insulation on the stator windings in the event the seal section or motor housing seals fail, embodiments of the present invention provide a stator that is itself sealed to prevent well fluid that has entered the motor from reaching the stator windings. This can be achieved by providing one or more solid elongated core sections made of soft magnetic composites (SMC), and sealing the ends of each core section to prevent the ingress of fluids. The SMC materials may include, for example, Somaloy 3P, and the like.

Various embodiments of the invention provide an ESP motor with a separated rotor chamber and a sealed stator chamber. The motor oil formulas in different chambers can be different to achieve specific performance requirements. The oil in stator chamber may be formulated for better electrical insulation, while the oil in rotor chamber may be formulated for better lubrication. If chemically unstable additives are not included in the oil within the stator chamber, but can stay contained in the rotor chamber, their impact on the winding insulation can be reduced or eliminated.

The stator chamber can be filled with oil and sealed as it is manufactured. In the manufacturing facility, the moisture concentration in the oil is easy to control. By contrast, when filling the rotor chamber with oil during the field installation, the moisture content of the oil is difficult to control, and extra moisture can easily get into the motor. The use of a separated rotor chamber and a sealed stator chamber can isolate the impact on the winding insulation of extra moisture in the oil that is introduced during installation.

Figure 3:
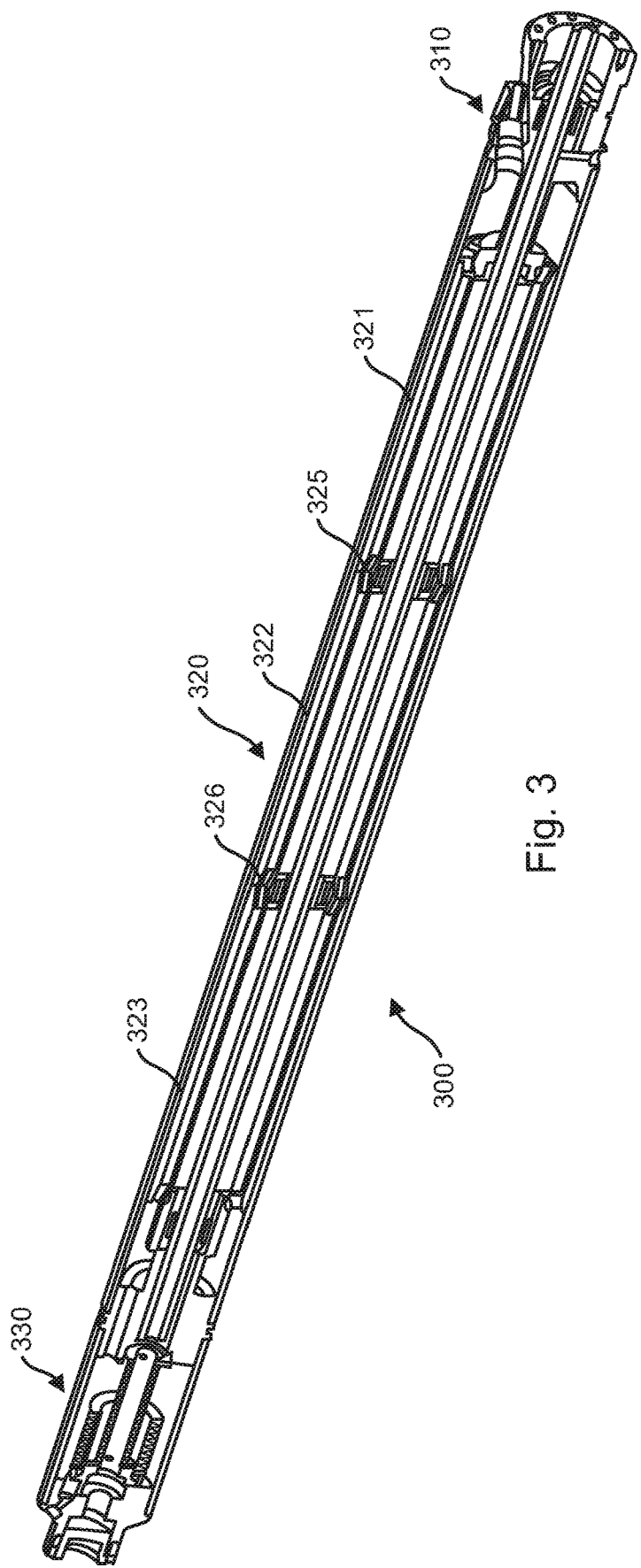
FIG. 3 is a diagram illustrating an embodiment of a motor that has multiple elongated, non-laminated stator sections with seals at the middle of stator section and at the ends of the stator sections to prevent ingress of wellbore fluids into the stator chamber.
Figure 4:
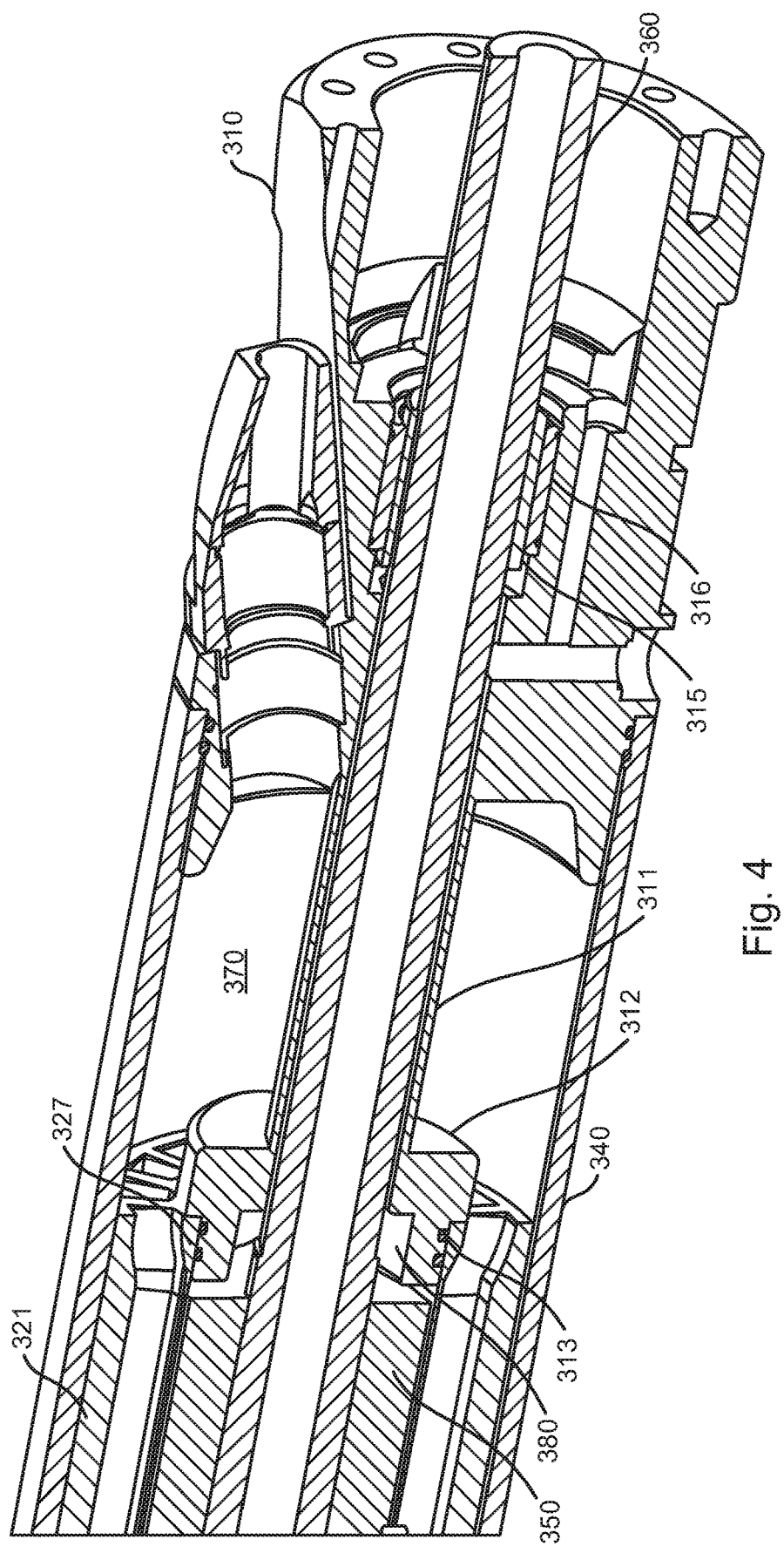
FIG. 4 is a diagram illustrating the head of the motor depicted in FIG. 3.
Figure 5:
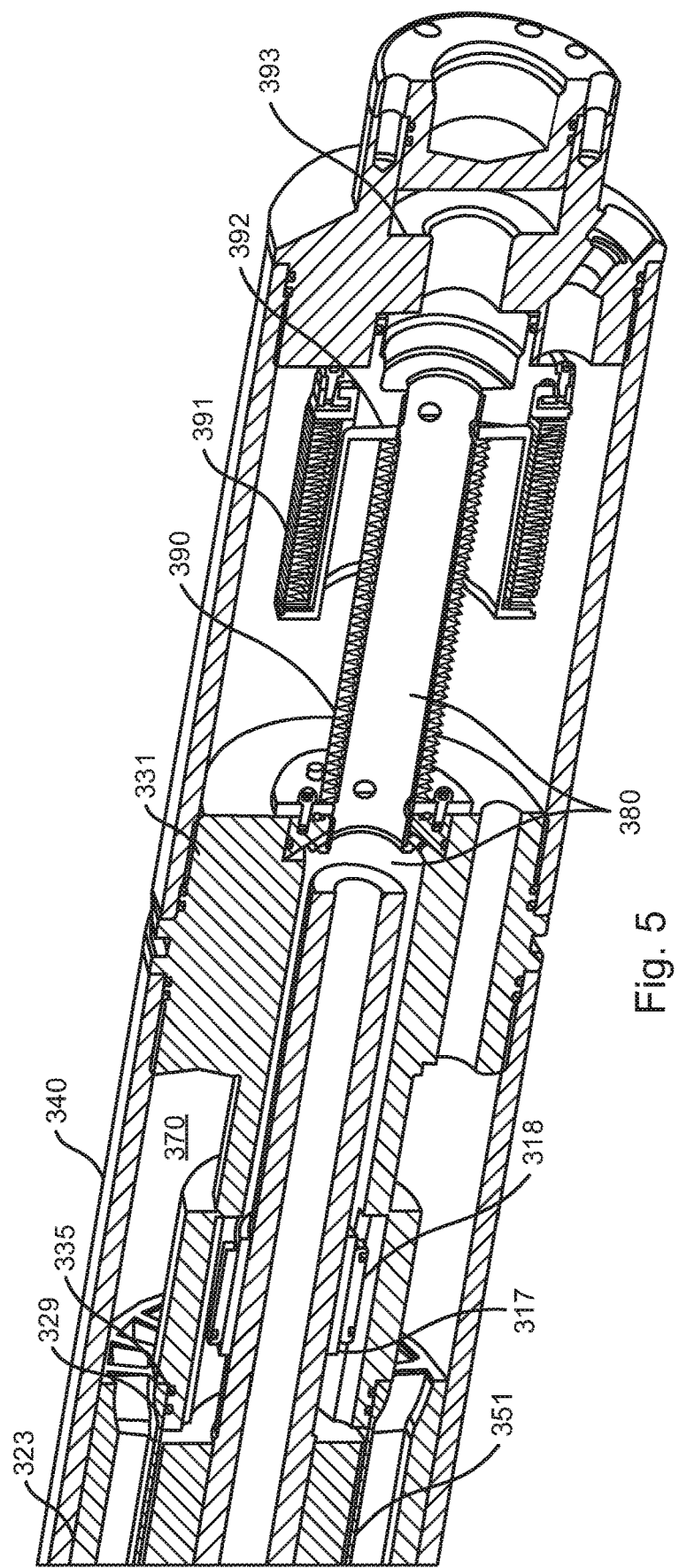
FIG. 5 is a diagram illustrating the base of the motor depicted in FIG. 3.

Referring to FIGS. 3-5, an exemplary ESP motor having a sealed stator in accordance with one embodiment is shown. FIG. 3 depicts a cross-sectional view of a motor having three elongated stator sections. FIG. 4 shows a cross-sectional view of the head of the motor. FIG. 5 shows a cross-sectional view of the base of the motor.

Referring to FIG. 3, motor 300 has a head 310, a body 320 and a base 330. Body 320 includes a core formed by three elongated stator core sections 321-323. Each of stator core sections 321-323 is formed as a single unit from soft magnetic composites, rather than a stack of laminations, as in conventional designs. (While the stator has a non-laminated structure, the rotor may still have a conventional laminated structure.) Because the stator sections have a non-laminated construction, they eliminate the prior art problem of fluid seeping between the laminations and into the stator slots. Gaskets or other seals (325, 326) are placed between the stator sections to prevent wellbore fluids from leaking into the stator slots from between the stator sections. In this embodiment, the non-laminated stator core sections are interfaced with each other at bearing locations. The closed-slot bridge has a protrusion at the bearing location to make the gasket seal better, but this can make the winding process a bit more challenging. Seals are provided at the ends of the stator sections by the head 310 and base 330 of the motor so that wellbore fluids which have penetrated the outer housing or seal section and entered the motor cannot enter the stator chamber from either the interface or the open ends of the slots.

In addition to using solid stator core sections made of soft magnetic composites instead of a laminated stator core, this embodiment has a separate pressure balanced chamber in fluid communication with the stator slots. This allows the pressure of the motor oil around the stator windings, end windings, Wye point (which may also be referred to as the Y-point), lead wires and pothead to be equalized with the surrounding volumes within the motor. The equalization prevents potential ingression of the wellbore fluids into the stator slots due to a pressure differential between the fluids inside and outside the stator slots. A separate pressure balanced rotor chamber which is in fluid communication with the air gap and rotors may also be provided. The rotor chamber would be filled with motor oil to provide bearing lubrication.

There may be several options for sealing the ends of stator slots. One embodiment may provide a separate pressure balanced stator chamber for the stator windings, end windings, insulation system, Wye point, lead wires and pothead. This embodiment is shown in FIGS. 3-5. This embodiment uses a metal bellows to enable the stator chamber to achieve pressure equalization. An alternative embodiment could seal the ends of the stator by providing threads and gaskets on the fixtures of the motor head and reservoir body. After the fixtures are secured, the stator chamber is filled with epoxy. In this embodiment, when the housing is under high pressure and undergoes deformation in the wellbore, the pressure on the epoxy in the stator chamber is less than the pressure outside the housing. Because high pressure can help to suppress partial discharge (which is detrimental to the electrical insulation on the windings), the pressure-equalized embodiment may be preferable to the embodiment in which epoxy fills the stator chamber.

Referring to FIG. 4, the interface between the stator and motor head is shown. In this figure, stator section 321 is positioned within an outer housing 340. A rotor 350 is coaxially positioned within the bore of stator section 321. The rotor is coupled to the shaft 360 of the motor. Shaft 360 extends from the rotor through the head 310 of the motor and is coupled to the seal section of the ESP. Bearing 315 and carrier 316 allow the shaft to be held in position in the motor while rotating freely. Motor head 310 has a tubular central portion 311 which terminates in a sealing fixture 312. Sealing fixture 312 fits within a slot bridge projection 327 at the end of stator section 321. O-rings 313 provide a seal between fixture 312 and slot bridge projection 327 that separates the stator chamber 370 from a rotor chamber 380.

Referring to FIG. 5, the interface between the stator and motor base is shown. In this figure, stator section 323 is shown in position within outer housing 340. A rotor 351 is coaxially positioned within the bore of stator section 323 and is coupled to shaft 360, which terminates within the base of the motor. Bearing 317 and carrier 318 hold the shaft in position in the motor while allowing it to rotate freely. Tungsten carbide bearings are preferred because it is expected that this type of bearing can have a long lifetime, even if wellbore fluid ingresses into the rotor chamber. A second fixture 331 fits within the end of housing 340 and extends to the end of stator section 323. Fixture 331 fits within a slot bridge projection 329 at the end of stator section 323. O-rings (e.g., 335) provide a seal between fixture 331 and slot bridge projection 329 that separates stator chamber 370 from rotor chamber 380. (Stator chamber 370 extends through the stator slots, and rotor chamber 380 extends through the air gap, from the motor head to the base.)

An expansion mechanism is provided in the base to allow equalization of the pressure between stator chamber 370 and rotor chamber 380. In this embodiment, the mechanism uses a metal bellows. More particularly, there is an inner bellows 390 and an outer bellows 391. A first end of inner bellows 390 is secured to fixture 331. The opposite end of bellows 390 is connected to a movable component 392. A first end of outer bellows 391 is also connected to a movable component 392, while the opposite end of bellows 391 is connected to a fixed component 393 that is secured to the end of the motor base. Movable component 392 can travel axially (generally left or right in the figure). As it does so, it changes the volume of stator chamber 370 and rotor chamber 380. As movable component 392 moves to the left in FIG. 5, it decreases the volume of stator chamber 370 and increases the volume of rotor chamber 380. When movable component 392 moves to the right, it increases the volume of stator chamber 370 and decreases the volume of rotor chamber 380. (In FIG. 5, movable component 392 is shown at its right-most position, so the volume of stator chamber 370 is maximized, and the volume of rotor chamber 380 is minimized.)

The non-laminated stator core sections can be manufactured with a high degree of smoothness, which could cause less friction loss. The air gap tolerance can also be tighter than a conventional laminated stator core section. The air gap of the non-laminated stator sections can also be smaller than in the case of laminated construction. At the same time, the friction loss of a non-laminated-stator/laminated-rotor design can be comparable with the laminated-stator/laminated-rotor case. The smaller air gap length can offset the relatively larger magneto-motive force (MMF) drop along the stator back iron, due to lower permeability of the stator back iron made of SMC.

The sealed stator construction described herein isolates the winding insulation from water absorption and can lead to longer run life of the stator winding insulation system, including insulation of the stator winding, end winding, Wye point, lead wire and pothead. Further, having a stator chamber which is separate from the rotor chamber allows the stator chamber to be filled with one type of fluid, while the rotor chamber is filled with a different type of fluid. This can eliminate potentially adverse impact of the fluid in the rotor chamber on the winding insulation. In the rotor chamber (including the air gap), currently used motor oil with additives can be still be applied to deliver the expected improved lubrication properties and reliability.

Various advantages of the present designs may include:
using a modular solid core can help to achieve a hermetically isolated chamber for the stator windings, which is not feasible for laminated stator core;
the unit stacking factor for the present designs compares with a stacking factor of around 96% for laminated silicon steel, and the present designs have a higher slot fill factor than laminated stator slots;
there is a potential for a reduced air gap as a result of the tight tolerance maintained in manufacturing soft magnetic composite material, and a potential for reduced friction loss as a result of smoother inner surface of the soft magnetic composite solid stator core for the same air gap length as conventional construction;
modular stator construction allows the possibility of easy removal of an individual modular stator section unit for quick repair or replacement, and the manufacturing cost can be lower even though the material cost is comparable or slightly greater than for laminated construction;
a stator manufactured from soft magnetic composite is easily recyclable since the stator can again be returned to powder form with pressure, and the copper windings can be readily removed, so this construction is environmentally friendly;
a stator made from soft magnetic composite has reduced high frequency harmonic losses caused by a variable frequency drive (VFD), since the soft magnetic composite has essentially no eddy current losses.

By implementing the designs described herein, the run life of an ESP motor can be extended, even if the seal section or motor housing seals fail and wellbore fluid ingresses into the motor. The reliability of the ESP motor can therefore be significantly improved, which is especially important with the high intervention costs of subsea applications.

It should be noted that, while some conventional motor designs use a nonmagnetic sleeve barrier that is positioned in the air gap between the stator and rotor to form a hermetically sealed motor, this type of design (sometimes referred to as a "canned motor") is impractical in the case of an ESP motor. This is because ESP motors are very small in diameter (e.g., 5-10 inches) and very long (e.g., tens of feet), and it is very difficult to manufacture and install a "can" that fits within the very thin (e.g., 30 thousandths of an inch) air gap without interfering with the rotor. Further, the mechanical integrity of the "can" will suffer if it is too thin and too long, but if it is thicker, the torque density will be significantly lower, especially in the case of an induction motor.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:
1. An apparatus comprising:
a stator having a stator core installed therein, the stator core having two or more stator core sections and having a bore therethrough;
a rotor which is installed within the bore;

an enclosed motor housing, wherein the rotor and stator are installed in the enclosed motor housing, thereby forming an electric motor;

wherein each of the two or more stator core sections is a single-piece, non-laminated unit formed of soft magnetic composite (SMC) material;

wherein the two or more stator core sections are positioned end-to-end, and wherein one or more seals are positioned directly abutting each end of each of the two or more stator core sections, thereby forming a plurality of stator slots, wherein each of the stator slots extends through each of the two or more stator core sections, wherein the stator slots are in fluid communication with each other and thereby form a stator chamber, wherein the stator chamber is separate from a bore through the stator core which is adapted to receive a rotor therein, wherein the one or more seals prevent fluids external to the stator chamber from entering the stator chamber.

2. The apparatus of claim 1, further comprising a rotor chamber within the motor housing which is separate from the stator chamber, wherein the rotor chamber includes the bore in which the rotor is installed.

3. The apparatus of claim 1, wherein a volume of the motor housing excluding the stator chamber is filled with a second oil, wherein the second oil lubricates the rotor but is prevented from entering the sealed stator chamber.

4. The apparatus of claim 1, wherein the stator chamber encloses the stator windings, one or more end windings, a Wye point of the motor, one or lead wires and a pothead connection.

5. The apparatus of claim 1, wherein each of the stator slots has one or more stator windings of insulated magnet wire installed therein, wherein the stator windings are sealed in the stator chamber.

6. The apparatus of claim 5, wherein the stator chamber is filled with a first, dielectric fluid.

7. The apparatus of claim 1, further comprising a pump that is coupled to the electric motor and is driven by the electric motor.

8. The apparatus of claim 7, further comprising an electric drive configured to generate output power, wherein the electric drive is coupled by a power cable to the electric motor, wherein the output power drives the electric motor.

9. The apparatus of claim 7, wherein each of the stator slots has one or more stator windings of insulated magnet wire installed therein, wherein the stator windings are sealed in the stator chamber.

10. An apparatus comprising:
a stator core having two or more stator core sections;
wherein each of the two or more stator core sections is a single-piece, non-laminated unit formed of soft magnetic composite (SMC) material;
wherein the two or more stator core sections are positioned end-to-end, and wherein one or more seals are positioned directly abutting each end of each of the two or more stator core sections, thereby forming a plurality of stator slots, wherein each of the stator slots extends through each of the two or more stator core sections, wherein the stator slots are in fluid communication with each other and thereby form a stator chamber, wherein the one or more seals prevent fluids external to the stator chamber from entering the stator chamber;
wherein each of the stator slots has one or more stator windings of insulated magnet wire installed therein, wherein the stator windings are sealed in the stator chamber;
wherein the stator chamber is filled with a first, dielectric fluid; and
wherein the stator chamber further comprises an expansion chamber internal to a stator in which the stator core is installed, wherein a volume of the expansion chamber is variable and accommodates temperature-dependent changes in a volume of the first, dielectric fluid.

11. The apparatus of claim 10, wherein the expansion chamber comprises one or more bellows connected to a movable component, wherein movement of the bellows and the movable component changes the volume of the expansion chamber.

* * * * *